Figure 1:
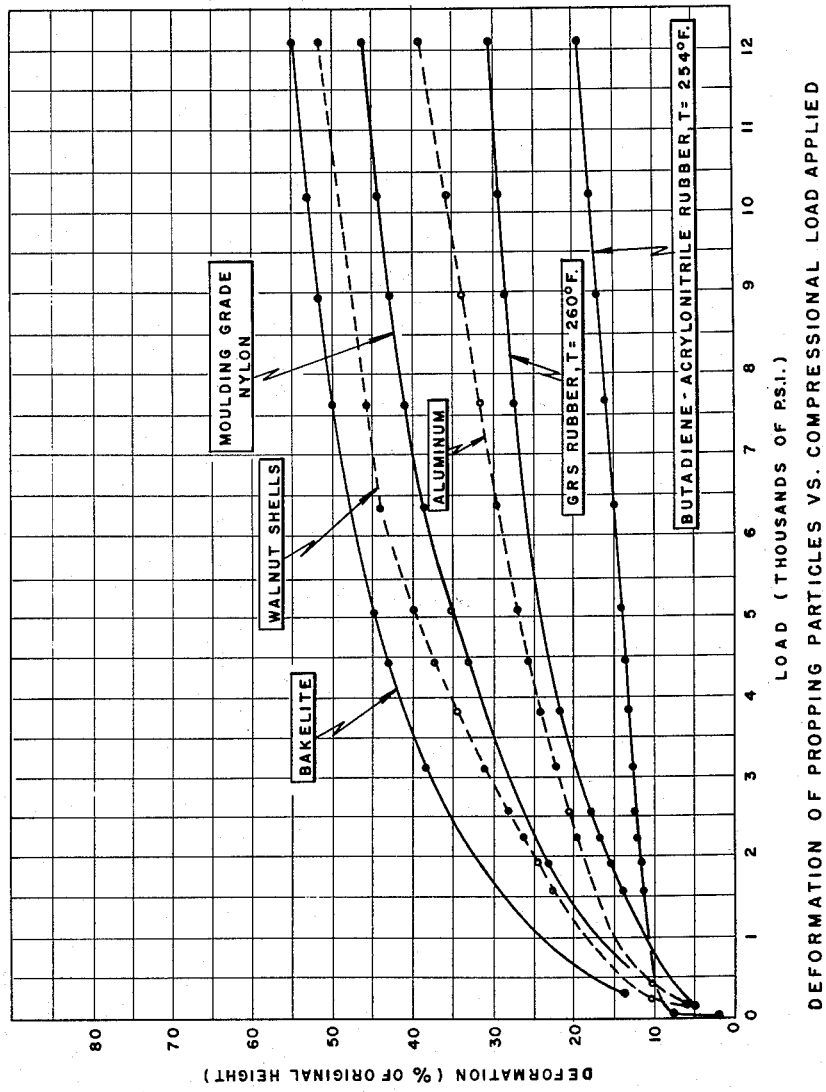

March 30, 1965    G. G. EAST ETAL    3,175,615
FRACTURING OF SUBSURFACE EARTH FORMATIONS
Filed Oct. 29, 1962    3 Sheets-Sheet 1

INVENTORS,
GERRY G. EAST,
JOSEPH A. BURKHARDT,
BY
ATTORNEY.

CYCLIZED PARACRIL PELLETS BEFORE AND AFTER
COMPRESSIONAL LOADING TO 12,000 P.S.I.

CYCLIZED GRC PELLETS BEFORE AND AFTER
COMPRESSIONAL LOADING TO 12,000 P.S.I.

OIL TREATED CYCLIZED PARACRIL PELLETS BEFORE
AND AFTER COMPRESSIONAL LOADING TO 12,000 P.S.I.

INVENTORS.
GERRY G. EAST,
JOSEPH A. BURKHARDT,
BY

ATTORNEY

March 30, 1965 G. G. EAST ETAL 3,175,615
FRACTURING OF SUBSURFACE EARTH FORMATIONS
Filed Oct. 29, 1962 3 Sheets-Sheet 3

DEFORMATION OF A CLOSE PACKED MONOLAYER OF CYCLIZED
BUTADIENE-ACRYLONITRILE RUBBERS VERSUS
COMPRESSIONAL LOAD APPLIED

INVENTORS.
GERRY G. EAST,
BY JOSEPH A. BURKHARDT,

ATTORNEY.

3,175,615
FRACTURING OF SUBSURFACE EARTH FORMATIONS
Gerry G. East and Joseph A. Burkhardt, Houston, Tex., assignors, by mesne assignments, to Jersey Production Research Company, Tulsa, Okla., a corporation of Delaware
Filed Oct. 29, 1962, Ser. No. 233,542
10 Claims. (Cl. 166—42)

The present invention is directed to hydraulic fracturing. More particularly, the invention is concerned with hydraulic fracturing of subsurface earth formations employing a pelletized propping agent. In its more specific aspects, the invention is concerned with a hydraulic fracturing operation employing a pelletized propping agent which has sustained load carrying and deformation resisting characteristics.

The present invention may be briefly described as a method for fracturing a subsurface earth formation penetrated by a well in which a formation pierced by the well is fractured, and there is then introduced into the fractured formation pellets as a propping agent. The pellets are formed from a butadiene-containing rubber which has first been cured and then hardened, the hardening being achieved by cyclization of the rubber by heat treating the pellets at a temperature within the range from about 500° F. to about 650° F. for a time from about 5 minutes to about 24 hours.

The butadiene-containing rubber is one which includes polybutadiene and copolymers of butadiene with various monomers such as styrene, acrylonitrile, and the like, which result in rubbery polymers. Ordinarily, butadiene is a major component of the butadiene rubber and may contain at least 30% by weight, and preferably greater than 50% by weight, of the copolymer. While acrylonitrile is preferred as the monomer, other monomers may be used such as styrene which may be effectively copolymerized with butadiene and which include the acrylic monomers, such as methyl methacrylate, acrylic acid, ethyl acrylate, and the like. Vinyl acetate, vinyl chloride, and the like may also be used. Only the butadiene rubbers are employable in forming pellets in the practice of the present invention in that other rubbers such as natural rubber, butyl rubber, and neoprene do not provide acceptable pelletized propping agents.

Pelleting is carried out by extrusion of the compound through appropriate dies and cutting of the extrudate into pellets. The cutting is generally done at the die face by means of rotating knives. A vent may be necessary on the extruder to eliminate gases which may lead to porosity in the extrudate. The dimensions of the pellets can range from 0.01 inch to 0.20 inch, but preferably from 0.03 to 0.10 inch. Preferably, the length should equal the width or diameter. Shapes may be cylindrical, spherical, oval, or any shape that will provide the desired degree of permeability in packed volumes. Unsaturated crosslinkable plasticizer oils can be added prior to extrusion. These oils are then cured and/or cyclized during the processing. The oils that can be used are of the same general chemical character as the rubbery materials. Especially effective are the hydrocarbon oily polymers of butadiene containing from 0 to 40 parts of styrene.

Various fillers may be added to the butadiene rubbers which may include carbon black, clay, silica, colloidal silica, ground quartz, coke, and the like. Fillers are satisfactory which have a particle size such that 95% of the fillers pass a 325-mesh screen. A preferred range of particle size is from 50 angstroms to about 100 mesh. Fillers of this particle size are satisfactory. Sand may be used.

The fillers may be used in an amount ranging from about 40 to about 100 parts of filler per 100 parts of the cyclized rubber.

The curing is conducted at about 250° F. to 400° F. for 1 minute to 10 hours, preferably 290° F. to 330° F. for 5 minutes to 1 hour with various peroxide or sulfur curing systems. Curing systems and conditions are not critical so long as dimensional stability is attained. Curing must take place under pressure (steam or press) to eliminate porosity. No cyclization takes place during the curing.

The cured pellets are hardened by cyclizing the rubber by heat treatment at a temperature in the range of about 500° F. to 650° F. for 24 hours to 5 minutes, preferably 550° F. to 600° F. for 5 hours to 30 minutes. In general, the temperature varies inversely with the time and varies within the indicated ranges for different rubbers. The proper temperatures are maintained while keeping the pellets moving, e.g., in a rotary kiln, in a fluidized bed, heat exchanging with inert solids, etc. The pellets thus produced are extremely useful for propping purposes. Their density of about 1 allows them to flow easily into the fracture with the fracturing fluid.

The butadiene rubbers may be cured by heat treatment employing sulfur or peroxide as curing agents. For example, compositions of butadiene-acrylonitrile rubber containing or having the following compositions and characteristics were made up, cured and then cyclized; single particles were then tested for flow at a constant pressure of 30 p.s.i.

TABLE I
Cyclization of Paracril compounds
[Varying cure and carbon black]

| Compositiion: | | | | |
|---|---|---|---|---|
| Paracril-C (Butadiene-acrylonitrile) | 100 | 100 | 100 | 100 |
| Pelletex (carbon black) | 50 | 50 | 75 | 100 |
| Stearic Acid | 1 | 2 | 2 | 2 |
| Zinc Oxide | 5 | 5 | 5 | 5 |
| Dicup 40 HAF Dicumyl peroxide) | | 5 | 5 | 5 |
| Sulfur | 1 | | | |
| Monex (Tetramethyl thiuram monosulfide) | 0.6 | | | |
| Pellet Diameter (inch) | .091 | .098 | .090 | .085 |

CYCLIZATION AT 565° F. (AFTER STEAM CURE FOR 30' AT 307° F.)

| Percent Flow at 30 p.s.i. | Percent Flow | Percent Flow | Percent Flow | Percent Flow |
|---|---|---|---|---|
| Cyclization Time (min.): | | | | |
| 30 | 60 | 53 | 47 | 44 |
| 50 | 46 | 40 | 34 | 31 |
| 60 | 27 | 35 | 30 | 27 |
| 70 | 32 | 33 | 26 | 25 |
| 80 | 31 | 30 | 25 | 24 |
| 90 | 27 | 28 | 24 | 22 |
| 100 | 25 | 25 | 25 | 23 |
| 110 | 22 | 25 | 22 | 22 |
| 120 | 24 | 25 | 22 | |
| 130 | 23 | 22 | 21 | |
| 140 | | 26 | | |
| 150 | 17 | 26 | 16 | |
| 160 | 27 | | | |

By way of explanation, the pelletized rubber is considered unsatisfactory as a propping agent unless the pellets have dimensional stability when subjected to compressional pressure such as encountered within a fractured formation.

Thus, the pellets must be able to withstand more than 10,000 p.s.i. and preferably more than 12,000 p.s.i. compressional loads.

Additional operations were performed on similar compositions with varying curing cycles and sizes. These data are illustrated in Table II.

TABLE II

Cyclization of Paracril compounds

[Varying curing cycle and size]

| Compound: | | | | |
|---|---|---|---|---|
| Paracril-C (Butadiene-acrylonitrile) | 100 | 100 | 100 | 100 |
| Pelletex (carbon black) | 50 | 50 | 50 | 50 |
| Stearic Acid | 2 | 2 | 2 | 2 |
| Zinc Oxide | 5 | 5 | 5 | 5 |
| Dicup 40 HAF (Dicumyl peroxide) | 5 | 5 | 5 | |
| Cured (Steam), °F | 30'/307 | 30'/307 | | |
| Pellet Diameter (inch) | .098 | .055 | .105 | .109 |

CYCLIZATION AT 565° F.

| Percent Flow at 30 p.s.i. | Percent Flow | Percent Flow | Percent Flow | Percent Flow |
|---|---|---|---|---|
| Cyclization Time (min.): | | | | |
| 30 | 53 | 41 | 60 | 68 |
| 50 | 40 | 38 | 56 | 56 |
| 60 | 35 | 37 | 49 | 51 |
| 70 | 33 | 44 | 45 | 47 |
| 80 | 30 | 46 | 45 | 40 |
| 90 | 28 | 46 | 44 | 42 |
| 100 | 25 | 48 | 43 | 39 |
| 110 | 25 | 55 | 52 | 37 |
| 120 | 25 | 33 | 53 | 38 |
| 130 | 22 | 39 | 57 | 43 |
| 140 | 26 | 33 | | |
| 150 | 26 | 33 | | |
| 180 | | 33 | | |

Additional compositions were made up and subjected to tests wherein silica fillers were employed. The results of these operations are shown in Table III.

TABLE III

Cyclization of Paracril compounds

Compound:
Paracril-C (butadiene-acrylonitrile) _____ 100
Silica _____ 50
Titanox ALO (titanium oxide) _____ 5
Stearic acid _____ 1
Zinc oxide _____ 5
PX441 (2,6-ditertiary 4-methyl phenol) _____ 1
Dicup 40C _____ 5
Pellet diameter (inch) _____ .090
Cyclization (after steam cure for 30 min. @ 307° F. _____° F__ 565

Percent flow at 30 p.s.i.:         Percent flow
Time (min.)—
    30 _____ 56
    50 _____ 39
    60 _____ 34
    70 _____ 31
    80 _____ 29
    90 _____ 27
    100 _____ 26
    120 _____ 25
    150 _____ 22
    180 _____ 22

Operations were performed with butadiene-styrene rubber to determine the flow properties of the pellets with the results shown in Table IV.

TABLE IV

Cyclization of butadiene-styrene

| Compound: | | |
|---|---|---|
| Butadiene-Styrene Rubber | 100 | 100 |
| Pelletex (carbon black) | 50 | 50 |
| Stearic Acid | 2 | 1 |
| Zinc Oxide | 5 | 5 |
| Dicup 40 HAF | 5 | |
| Sulfur | | 0.5 |
| Tuads (tetramethylthiuram disulfide) | | 1.5 |
| Altax (di-2-benzothiazyl disulfide) | | 1.0 |
| Ethyl Tuads | | 1.5 |
| Pellet diameter (inch) | .094 | .084 |

TABLE IV—(Continued)

CYCLIZATION AT 565° F. (AFTER STEAM CURE FOR 30' AT 307° F.)

| Percent Flow at 30 p.s.i. | Percent Flow | Percent Flow |
|---|---|---|
| Time (min.): | | |
| 30 | 38 | 69 |
| 50 | 41 | 69 |
| 60 | 43 | 64 |
| 70 | 43 | 61 |
| 80 | 44 | 60 |
| 90 | 47 | 61 |
| 100 | 49 | 53 |
| 110 | 57 | 55 |
| 120 | 35 | 48 |
| 130 | 39 | 51 |
| 140 | 35 | 50 |
| 150 | 34 | 47 |
| 160 | 34 | 45 |
| 180 | 31 | 42 |
| 270 | 30 | 35 |
| 330 | 30 | 34 |

It will be seen from the data provided in the several tables that butadiene-acrylonitrile and butadiene-styrene rubbers produce satisfactory pellets for fracturing operations.

In employing the pelletized rubber in fracturing operations, the pellets are suitably added to a fracturing liquid which may be a hydrocarbon or may be an aqueous fracturing liquid, such as fresh or salt water. Other fracturing liquids such as oil-in-water emulsions, water-in-oil emulsions, oil-in-acid emulsions, acidic fluids, and the like, may be used. As a general statement, the fracturing liquids which are known to the art may be employed in the practice of the present invention and may suitably contain various materials for controlling the viscosity and/or fluid loss thereof. The fracturing liquid may contain pellets in an amount within the range from about 0.10 to about 5.0 pounds of the pellets per gallon of liquid, whether it be an oily or an aqueous liquid. It may be desirable under some circumstances to add materials to the liquid vehicle in which the pellets are suspended which will maintain the pellets as a suspension therein.

In practicing the present invention, a subsurface earth formation penetrated by a well may have a suspension of the pellets introduced as a suspension thereinto under pressure against an exposed formation, following which the pressure on the suspension is increased until the breakdown pressure of the formation is achieved which causes fractures, either vertical or horizontal, to extend out from the well bore. The formation of fractures may be indicated by a drop in pump pressure and/or an increase in pump rate. Upon parting the formation, the carrier fluid containing the pelletized propping agent is injected into the extending fracture and, when injection is stopped, the solid pellets maintain the fracture open. Thereafter, the well is placed on production by providing a pressure differential from the formation into the well which is suitably achieved by swabbing or by replacing the liquid in the well with a lighter liquid. The fracturing liquid is flushed back into the well ahead of hydrocarbons produced in the well and thus removed therefrom.

The present invention may be practiced by hydraulically fracturing the formation pierced by the well using a fracturing liquid, following which a liquid suspension of the pellets in an aqueous or oily vehicle may be introduced into the well in contact with the fractured formation, following which sufficient pressure is applied to force the suspension into the formation to lodge the pellets in the fractures and maintain them open. Thus, the formation may be fractured with a fracturing liquid such as an oily or aqueous vehicle, an acid gel, or an emulsion, and when a fracture is indicated by a drop in pressure, the liquid suspension is immediately forced into the fractured formation under a sufficiently high pressure to maintain the fractures open. In short, the fracturing liquid may be followed by the liquid suspension of the pellets, although the fracturing may be initially performed with the suspension.

The pellets employed in propping the fractures open have unique properties in that the pellets do not crush or shatter when subjected to pressures such as existing in fractures in an earth formation in which the pellets are lodged. Heretofore, in fracturing subsurface earth formations, it has been the practice to employ granular materials such as sand, nut shells, nut hulls, as well as metallic spherals, such as aluminum spherals, to prop the fractures open. Sand is a rigid material such that, on reaching its load limit, it shatters completely, leaving virtually no fracture width, and also its crushing results in a large quantity of fine particles which reduce greatly the ability of the remaining fracture, if any, to conduct fluid. Nut hulls such as walnut hulls break into particles and also produce fines. Aluminum spheres are expensive and have the further disadvantage of being readily attacked by acid or caustic solutions used in well treating operations. Additionally, aluminum spheres may allow the establishment of a galvanic cell (aluminum-electrolyte-steel). These latter disadvantages are aggravated by high well temperatures. The pellets employed in the present invention deform without crushing but, on deformation, the area of contact thereof is increased which is beneficial in maintaining fractures open. The pellets are lightweight and are of controllable density which allows large pellets to be carried into the fractures readily. Moreover, the pellets are not attacked by well fluids, including hydrocarbons, acid, or caustic.

The pellets, whether used in the form of spherical, cylindrical, or irregularly shaped pellets, may be easily handled in a wet or dry condition. Thus, the pellets may be bagged and transported to the well site and then introduced into fracturing liquid whether it be an oily or aqueous vehicle. Thus, the pellets may be introduced into the pump liquid through a hopper and the pump liquid thus formed into a suspension and then introduced into the well through a tubing or casing-tubing annulus and thence into a subsurface earth formation pierced by the well, either through perforations in the well casing or in an open hole below the casing. Under some circumstances it may be desirable, when the suspension is introduced through the tubing, to confine the area which is to be fractured by employing a packer closing the casing-tubing annulus.

The amount of pressure employed in fracturing operations is well known and is easily determinable from the type of formation and the depth thereof in the well.

It is to be emphasized in the practice of the present invention that the cured and cyclized butadiene rubber is not employed as a coating. The cured and cyclized rubber is employed to form pellets which are used as a propping agent in fracturing operations. The properties of the pellets are governed by the properties of the cyclized rubber. The filler controls the density of the pellet. The filler which is used in amounts of about 40 to about 100 parts per 100 parts of cyclized rubber is a fine powder having a size from about 50 angstroms to about 100 mesh and is uniformly dispersed in the rubber so that the finished pellet is comprised of rubber primarily with finely divided particles dispersed in the rubber. An advantage of the use of fillers is the control of pellet density. The cyclized rubber has a density of about 1.0 to about 1.3 and may range from about 1.0 to 1.2, as compared to the density of sand which is about 2.65 grams per cc. Thus, using a filler of low density results in a pellet which is quite light. A pellet having a density from about 1.0 to about 1.6 may be provided. A low density pellet is of substantial advantage when it is necessary or desirable to fracture formations at low rates with low viscosity fracturing liquids. Likewise, if high density pellets are needed, the desired density may be obtained by employing high density fillers. In short, the employment of fillers is optional, and pellets of controlled hardness, strength, density and malleability are provided.

In order to illustrate the present invention further, deformations as a functional load of several materials were investigated. The results of these investigations are set out in Table V.

TABLE V

| Material: | Max. deformation at 12,000 p.s.i. (percent original height) |
|---|---|
| Paracril (butadiene-acrylonitrile) | 21.0 |
| GRS (butadiene-styrene) | 30.2 |
| Aluminum | 39.2 |
| Nylon | 42.4 |
| Walnut hulls | 52.1 |
| Bakelite | 54.9 |

These data were obtained on cyclized butadiene-styrene rubber and cyclized butadiene-acrylonitrile rubber. The butadiene rubbers were tested for deformation at elevated temperatures of 260° F. and 254° F., respectively, the butadiene-styrene rubber being tested at the higher temperature.

The data in Table V shows that the cyclized rubber pellets deformed less than all other materials employed. This deformation was obtained by loading a closely packed monolayer of the rubber particles. The data are also presented in FIG. 1 which is a plot of deformation against load (thousands of p.s.i.). It is to be emphasized that only the cured and cyclized butadiene rubbers were satisfactory.

Figure 2:
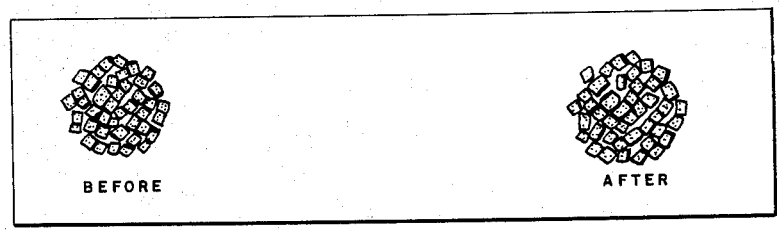
Figure 3:
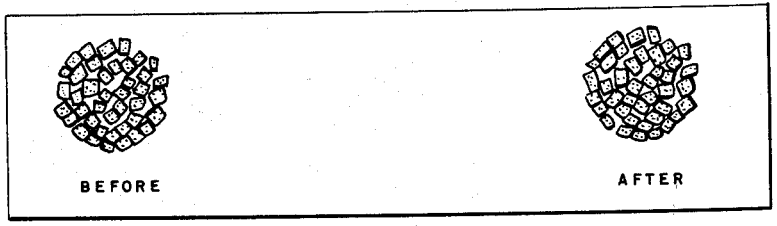

Other operations were performed on butadiene-styrene and butadiene-acrylonitrile cured and cyclized rubbers. Monolayers of pellets were subjected to excessive loads. Drawings made from actual photographs of the pellets before and after loading are shown in FIGS. 2 and 3. It will be clear that both of the rubbers were subjected to loading without any sign of rupture.

Figure 4:
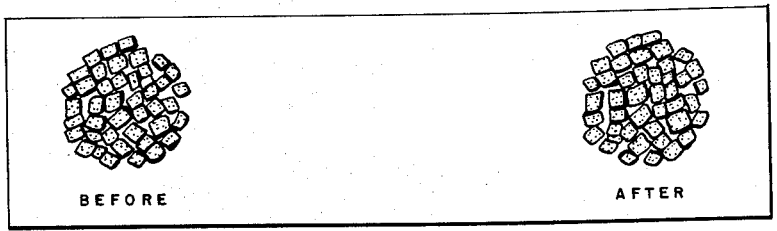

To illustrate the effect of oil on the pellets, the cyclized pellets were subjected to a high aromatic crude oil for six weeks at a temperature of 190° F. The pellets were subjected to deformation by imposing upon them compressional loads of 12,000 p.s.i. FIG. 4 shows comparative "before" and "after" drawings made from actual photographs.

Figure 5:
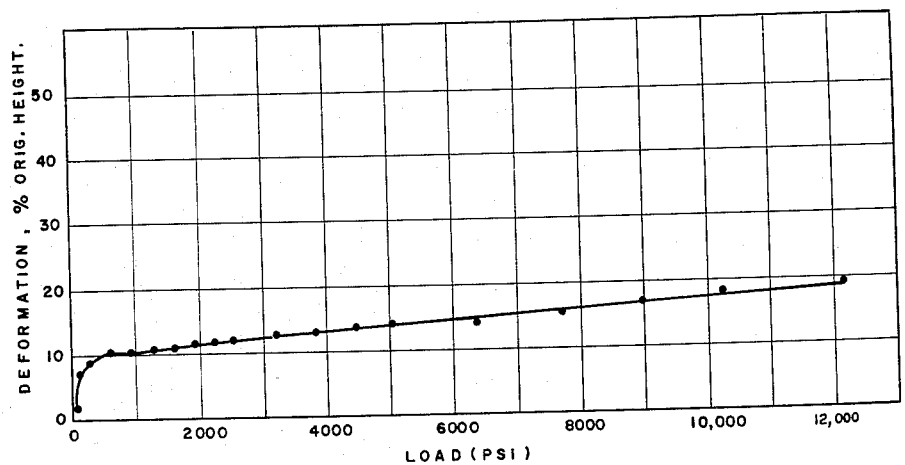

An important feature of the present invention is that deformation of a closely packed layer of cubical pellets does not exceed 30% to 40% at a compressional load of 12,000 p.s.i. with approximately half of this deformation at 12,000 p.s.i. load occurring within the first 500–1500 p.s.i. loading. This is illustrated in FIG. 5 wherein slightly less than 20% deformation occurred at 12,100 p.s.i. and wherein half of this deformation occurred at 600–700 p.s.i., while the other half occurred between 700 p.s.i. and 12,100 p.s.i.

The present invention is quite advantageous and useful in that it allows extremely hard formations, such as the limestone and dolomite structures of West Texas, to be fractured and maintained open employing pellets which do not crush. Thus, sand grains employed in these operations may be shattered. It has been found that individual sand grains will shatter under 3 to 12 pound load on a single grain. A uniform layer of Ottawa sand will fail between 3000 and 4000 p.s.i.

In relatively soft formations, sand grains used heretofore tend to embed in the soft formation and allow the fractures created by hydraulic fracturing to heal, and thus no channel exists for production of hydrocarbon fluids. Thus, in the practice of the present invention, the pellets do not shatter in hard formations and, in soft formations the pellets resist embedment by deforming to expose a larger pellet area to sustain the load. Thus, less pressure on the formation face is experienced. In both cases, the pellets maintain the fractures in an open condition for production of valuable earth fluids such as, but not limited to, oil, gas, hydrocarbons, and the like.

While relatively hard and relatively soft formations have been mentioned, the invention is not limited to propping such formations open, but is applicable to all types of earth formations encountered.

The nature and objects of the present invention having been adequately described and illustrated and the best mode thereof set forth, what we wish to claim as new and useful and secure by Letters Patent is:

1. A process for increasing the productivity of a subsurface earth formation pierced by a well bore which comprises fracturing said formation by forcing a fracturing liquid under a sufficient pressure down said well and into said formation to form fractures in said formation and then flowing into said fractures fracturing liquid having suspended therein pellets consisting essentially of a butadiene-containing rubber selected from the group consisting of butadiene-styrene and butadiene-acrylonitrile rubbers which have been first cured and then hardened, said hardening being achieved by cyclization of the rubber by heat treating the pellets at a temperature within the range of 500° to 650° F. for a time from about 5 minutes to about 24 hours.

2. A process in accordance with claim 1 in which the butadiene-containing rubber is a butadiene-acrylonitrile rubber.

3. A process in accordance with claim 1 in which the butadiene-containing rubber is a copolymer containing at least 50% by weight of butadiene.

4. A process in accordance with claim 1 in which the pellets contain from about 40 to about 100 parts of a filler per 100 parts of the cyclized rubber, said filler having a particle size from about 50 angstroms to about 325 mesh.

5. A process in accordance with claim 4 in which the pellets have a size within the range from about 0.01 to about 0.2 inch.

6. A process in accordance with claim 1 in which the pellets are cured at a temperature within the range of 250° to 400° F. for about one minute to about 10 hours.

7. A process in accordance with claim 1 in which the pellet has a controlled density within the range from about 1.0 to about 1.6 grams per cc.

8. A process in accordance with claim 7 in which the density of the pellet is controlled by incorporating in the rubber a controlled amount of sand having a particle size such that 95% pass a 325-mesh screen.

9. A process in accordance with claim 1 in which about 0.1 to about 5.0 pounds of pellets per gallon of fracturing liquid are suspended in the fracturing liquid.

10. A process in accordance with claim 1 in which the butadiene-containing rubber is a butadiene-styrene rubber.

References Cited by the Examiner
UNITED STATES PATENTS

| | | | |
|---|---|---|---|
| 2,661,340 | 12/53 | Van Veersen | 260—94.7 X |
| 2,962,095 | 11/60 | Morse | 166—42.1 X |
| 2,989,504 | 6/61 | Little | 260—83.3 X |
| 3,026,938 | 3/62 | Huitt et al. | 166—42.1 |
| 3,089,542 | 5/63 | Kolodny | 166—42.1 |

CHARLES E. O'CONNELL, *Primary Examiner.*